US006321275B1

(12) United States Patent
McQuistan et al.

(10) Patent No.: US 6,321,275 B1
(45) Date of Patent: Nov. 20, 2001

(54) INTERPRETED REMOTE PROCEDURE CALLS

(75) Inventors: Bruce Wallace McQuistan, Seattle; Dov Harel, Bellevue, both of WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 08/959,283

(22) Filed: Oct. 24, 1997

Related U.S. Application Data (63) Continuation of application No. 08/427,050, filed on Apr. 24, 1995, which is a continuation of application No. 08/477,539, filed on Jun. 7, 1995, now abandoned, which is a continuation of application No. 08/427,050, filed on Apr. 24, 1995, now abandoned.

(51) Int. Cl.[7] .................................................. G06F 9/54
(52) U.S. Cl. ............................................................ 709/330
(58) Field of Search .................................. 709/304–305, 709/310–332; 395/600

(56) References Cited

U.S. PATENT DOCUMENTS 5,465,351 * 11/1995 Lemmo .................................. 707/10

OTHER PUBLICATIONS

The Component Object Model Specification (Draft) pp 1–193, Mar. 6, 1995.*

ORB 2.0 RFP Submission, DCE Common Intes–ORB Protocol, OMG TC Document 94.9.41 version 1.0, Sep. 28, 1994.*

Dineen, et al; The Network Computing Architecturg and System. An Environment for Developing Distributed Applications, IEEE pp 296–298, 1988.*

James Finnigan, Building Windows NT–based Client Server applications using remote procedure calls Microsoft Systems Journal V9 n10 p65 (13), Oct. 1994.*

Rosenberry, Ward and Jim Teague, Distributing Applications Across DCE and Windows NT, Digital Equipment Corporation, O'Reilly & Associates, Inc., Sebastopol, CA 95472, ©1993, pp. 43–62.

(List continued on next page.)

*Primary Examiner*—St. John Courtenay, III
(74) *Attorney, Agent, or Firm*—Klarquist Sparkman, LLP (57) ABSTRACT

The present invention performs interpreted remote procedure calls. By utilizing an interpreter, the present invention saves significant storage within a data processing system that performs remote procedure calls. The interpreter of the present invention performs all marshaling and unmarshaling of arguments, thereby consolidating the marshaling and unmarshaling code within a single entity, the interpreter. In performing the marshaling and unmarshaling, the present invention utilizes a descriptor table which contains information pertaining to the argument stack of the remote procedures. By utilizing the present invention, stubs are no longer needed to be used with server side application programs and therefore redundant code and data are minimized throughout the system. However, the present invention also has the flexibility to use stubs with server side application programs where the stubs of the present invention contain a minimal amount of code to interact with the interpreter. By centralizing the marshaling and unmarshaling code into the interpreter, the present invention reduces storage requirements by minimizing the duplication of code throughout the data processing system.

22 Claims, 8 Drawing Sheets

OTHER PUBLICATIONS

Kessler, Peter B., A Client–Side Stub Interpreter, SunSoft, Inc., Mountain View, CA 94043–1100, ACM Sigplan Notices, vol. 29, No. 8, Aug. 1994, IDL Workshop, pp. 94–100.

Bloomer, John, Power Programming with RPC, Unix Network Programming, Associates, Inc., O'Reilly & Associates, Inc., Sebastopol, CA 95472, ©1991, pp. 1–16.

Application Environment Specification (AES), Distributed Computing RPC Volume, Revision A, P T R Prentice Hall, Englewood Cliffs, New Jersey 07632, ©1994, Chapters 2, 4, 5, 6, 7 and 14.

Nelson, Bruce Jay, Remote Procedure Call, Xerox Palo Alto Research Center, May 1981.

"DCE Lightens Its Load" by David S. Limthicum, DBMS, V9, n7 p24(3) Jun, 1996.*

* cited by examiner

INTERPRETED REMOTE PROCEDURE CALLS

CROSS-REFERENCE TO RELATED APPLICATIONS

This application is a continuation of U.S. patent application Ser. No. 08/477,539, filed Jun. 7, 1995, now abandoned, which was a continuation of U.S. patent application Ser. No. 08/427,050, filed Apr. 24, 1995, now abandoned.

TECHNICAL FIELD

The present invention relates generally to data processing systems, and, more particularly, to utilizing an interpreter as part of a remote procedure call system.

BACKGROUND OF THE INVENTION

A "remote procedure call" (RPC) refers to a procedure or function call initiated by a computer program ("caller") of another computer program ("callee"), where the two computer programs are in separate address spaces. After invoking the function, the results of the invocation (e.g., success or failure) are usually returned to the caller.

Figure 1:
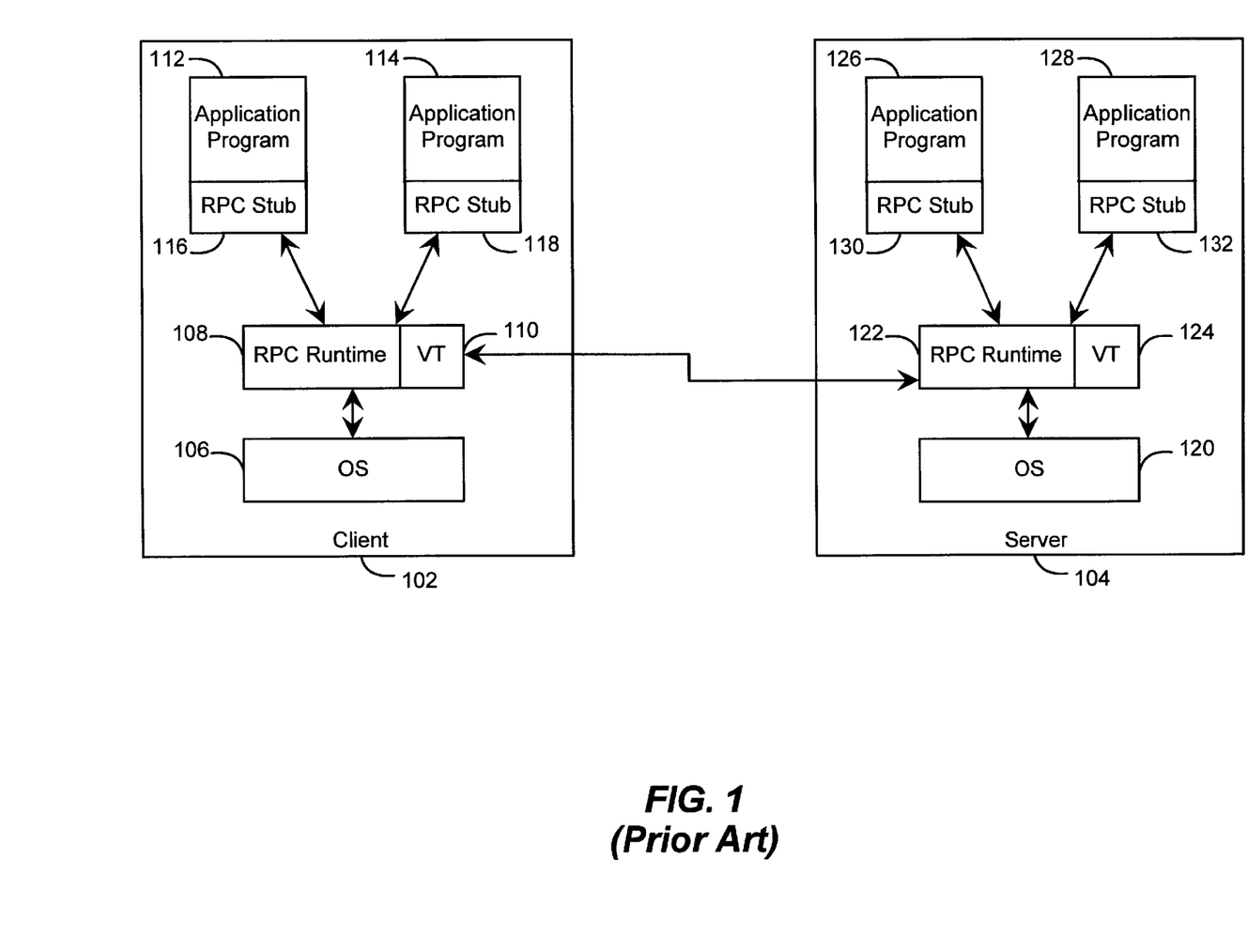
FIG. 1 depicts a block diagram of a conventional system for performing remote procedure calls.

FIG. 1 depicts a block diagram of a conventional system for performing remote procedure calls. The conventional RPC system, as depicted in FIG. 1, has a client 102 and a server 104. The client 102 and the server 104 are separate computer systems that are interconnected. Both the client 102 and the server 104 contain an operating system 106, 120, and an RPC runtime facility 108, 122 that contains a virtual function table ("VT") 110, 124. In addition, the client 102 and the server 104 contain two application programs 112, 114 and 126, 128, and one RPC stub for each application program 116, 118, 130, 132. The operating systems 106, 120 are responsible for managing system resources. The RPC runtime facilities 108, 122 serve to transfer a remote procedure call from the client 102 to the server 104 and to return results of the remote procedure call from the server to the client. The RPC runtime facilities 108, 122 contain a virtual function table 110, 124 and look-up information that is used to locate the function being invoked by the remote procedure call. The application programs 112, 114 request the invocation of functions that are local to application programs 126, 128. The RPC stubs 116, 118 of the client 102 are usually referred to as "client stubs" and provide functions that have similar signatures to functions contained within application programs 126, 128. The "signature" of a function refers to the specific arguments, function name and return code for the function. Thus, by providing a similar signature, the client stubs 116, 118 make it appear to the application programs 112, 114 that the invocation of-the function is local. Although the client stubs 116, 118 make it appear to the application programs 112, 114 that the invocation of the function is local, the client stubs actually translate the function call into a number of calls to the RPC runtime facility 108 so as to interface with the RPC runtime and invoke the function remotely. The RPC stubs 130, 132 of the server 104 are usually referred to as "server stubs" and receive information from the RPC runtime facility 122 sufficient to create a local function call. After completion of the function call, the server stubs 130, 132 return results to the RPC runtime facility 122 which in turn sends the results back to the caller.

The RPC runtime facility utilizes a buffer ("runtime buffer") to send data associated with the RPC (e.g., arguments) from the client to the server as well as to return results from the server to the client. An "argument" is a parameter of a function. The RPC stubs of the client and the server contain both code and data that are used together to interface with the RPC runtime. The code of RPC stubs copies arguments for a particular function into the runtime buffer (this process is known as "marshaling") as well as copies arguments out of the runtime buffer (this process is known as "unmarshaling"). When copying the arguments into the runtime buffer, the arguments are laid out in a format specific to the runtime buffer, whereas the functions typically use the arguments in a different format. The code of the RPC stubs includes information necessary to create an argument stack for a particular function. An "argument stack" refers to a buffer that contains arguments for the function in a specific order, with each argument having a specific size, type and value. The information necessary for creating the argument stack ("format information") is determined at compile time and includes the order of the arguments, the size of the arguments and the type of the arguments. The values of the arguments are typically dead at runtime. The argument stack is usually a necessary component of a function invocation.

In many conventional systems, RPC stubs are created by an interface definition language ("IDL") compiler. The IDL compiler understands a language that is used to define functions and their signatures. A user utilizes an IDL compiler by first creating an IDL file that contains the signatures of a number of functions that are to be invoked remotely. Then, the user invokes the IDL compiler to compile the IDL file into C or C++ code. Lastly, the user invokes a C or C++ compiler to generate machine code that serves as the RPC stubs to be utilized by application programs when performing RPCs.

There are various different types of arguments that are utilized within an RPC system. These types of arguments fall into four categories: base types, pointer types, homogeneous types and heterogeneous types. The "base types" category includes standard C data types, such as long, int, short and char. The "pointer types" category refers to references to the standard C base types. In addition to referring to C base types, pointer types are directional in nature and can be specified to be an "in" pointer, an "in/out" pointer or an "out" pointer. The "in" directional pointer is a pointer that is being passed into the function that references data to be used by the invoked function but will be disregarded after the execution of the function. Therefore, an in argument need only be transferred from the client to the server. An "in/out" directional pointer is a pointer that references data that will be passed in to be utilized by a remote function and will also be utilized by the caller upon return of the function. Thus, in/out arguments are transferred from the client to the server as well as from the server to the client. An "out" directional pointer refers to data that is utilized by the caller upon return of the function. As such, an out argument is transferred from the server to the client. In addition to the directionality of a pointer, pointers can refer to conformant or varying objects. A "conformant object" is an object whose size is determined at runtime, such as a conformant array that is allocated at runtime. When a conformant object is utilized as an argument, another argument follows the conformant object known as a "specifier argument" that specifies the size of the conformant object. A "varying object" is an object whose size is known at compile time, but the range of usable elements is determined at runtime, such as occurs when passing a subset of elements of an array as an argument. When utilizing a varying object as an argument, a specifier argument is utilized to specify the range of elements within the varying object. The homogeneous type refers to a grouping of similar data types, such as an array of integers. The heterogeneous type refers to a grouping of dissimilar data types, such as a structure or a union.

In performing an RPC by the conventional system depicted in FIG. 1, a calling application program within the client invokes the client stub that has a similar signature to a remote function that the calling application program wishes to invoke. To the caller, it appears as if the invocation of the remote function occurs locally. The client stub receives arguments as part of the invocation and sizes the arguments. When sizing the arguments, the client stub determines the size of each argument and when encountering a pointer, determines the size of the data that is referenced by the pointer. The client stub then allocates a buffer of the determined size from the RPC runtime facility, thus creating a runtime buffer, and copies the "in" and "in/out" arguments into the buffer. After copying the arguments into the buffer, the client stub o the client side RPC runtime facility to send the runtime buffer to the server side RPC runtime facility. When the server side RPC runtime facility receives the runtime buffer, the server side RPC runtime facility accesses the virtual function table to determine the application program that the requested function. The server side RPC runtime facility then passes the runtime buffer to a server stub of the destination application program. The server stub copies the data and directly invokes the function. When copying the data, the server stub takes the arguments out of the RPC runtime buffer and stores them into a buffer according to the format information of the argument stack that was created at compile time, thereby creating an argument stack. After storing the arguments, the server stub invokes the function with the argument stack and upon completion of the function, receives the results (i.e., in/out arguments, out arguments and a return value). The server stub then determines the size of the results, allocates a runtime buffer of this size and copies the results into the buffer. Only in/out arguments, out arguments and a return value are processed since this is the only data returned to the caller. After copying the results into the runtime buffer, the runtime buffer is sent from the server side RPC runtime facility to the client side RPC runtime facility where it is passed to the caller via the client stub.

Using conventional systems for performing RPC leads to the use of significant amounts of storage. This significant storage is in part due to the duplication of RPC stubs throughout the system. Each RPC stub within the system marshals arguments into a runtime buffer and unmarshals arguments out of a runtime buffer. The code for performing this operation is duplicated for each stub in the system. In addition, since all sizing and copying of arguments is specific to the signature of the function being invoked, if two functions have the same signature, the stub for each function is the same, thereby leading to an excessive use of storage.

SUMMARY OF THE INVENTION

The present invention performs remote procedure calls utilizing a translation mechanism in the form of an interpreter. By utilizing a translation mechanism, the system saves significant storage within a data processing system that performs remote procedure calls. The translation mechanism performs all marshaling and unmarshaling of arguments, thereby consolidating the marshaling and unmarshaling code within a single entity the translation mechanism. By utilizing the translation mechanism, stubs are no longer needed to be used with server side application programs, thereby reducing the amount of storage used in the system. However, the translation mechanism also allows for the flexibility to use stubs widths server side application programs where the stubs contain a minimal amount of code to interact with the translation mechanism. By centralizing the marshaling and unmarshaling code into the translation mechanism, storage requirements are reduced by reducing the duplication of code throughout the data processing system. In addition, when the translation mechanism is utilized without server side stubs, the duplication of code within the system is further reduced.

In accordance with a first aspect of the present invention, a method is provided in a data processing system having a communication mechanism and a computer program containing functions for remote invocation. The method of the first aspect of the present invention includes providing an interpreter to the computer program wherein the interpreter translates data from a format acceptable to the communication mechanism to a format acceptable to a function at runtime. Further, this method provides for receiving data by the communication mechanism, sending the data to the interpreter, translating the data from a format acceptable to the communication mechanism to a format acceptable to the function by the interpreter, and sending the data to the computer program by the interpreter to invoke the function.

In accordance with a second aspect of the present invention, a remote procedure call system is provided. The remote procedure call system of the second aspect of the present invention includes a client for requesting invocation of a remote function and a server for receiving a request for the invocation of the remote function and for invoking the remote function. The server of the remote procedure call system of the second aspect of the present invention further comprises a computer program having the remote function, a communication mechanism for transferring the request from the client to the server, and an interpreter for receiving the request to invoke the remote function from the communication mechanism and for translating the request from a format acceptable to the communication mechanism to a format acceptable to the remote function at run time. In addition, the interpreter provides for creating an argument stack containing the arguments for the remote function and for invoking the remote function with the argument stack.

DETAILED DESCRIPTION OF THE INVENTION

Embodiments of the present invention perform remote procedure calls utilizing an interpreter on the server side. An "interpreter," in the general sense, translates information from one format to another format at runtime. In the context of RPC, the interpreter of an embodiment of the present invention marshals and unmarshals arguments and creates server side argument stacks at runtime for any function whose signature contains a finite number of arguments. The interpreter consolidates the code and data that was typically duplicated across many stubs by conventional systems. Therefore, total system storage associated with remote procedure calls is significantly reduced by embodiments of the present invention. The interpreted RPC of the present invention is described below relative to two embodiments, although other embodiments will be apparent to one skilled in the art. The preferred embodiment performs interpreted RPC, without the use of stubs on the server side. Therefore, no code or data is duplicated on the server side, thereby saving significant amounts of storage. An alternative embodiment of the present invention provides stubs on the server side, but still reduces the amount of code necessary for performing remote procedure calls over conventional systems. That is, the alternative embodiment uses the interpreter for marshaling and unmarshaling and therefore, the sere stubs of the alternative embodiment only have sufficient code for interfacing with the interpreter.

Figure 2:
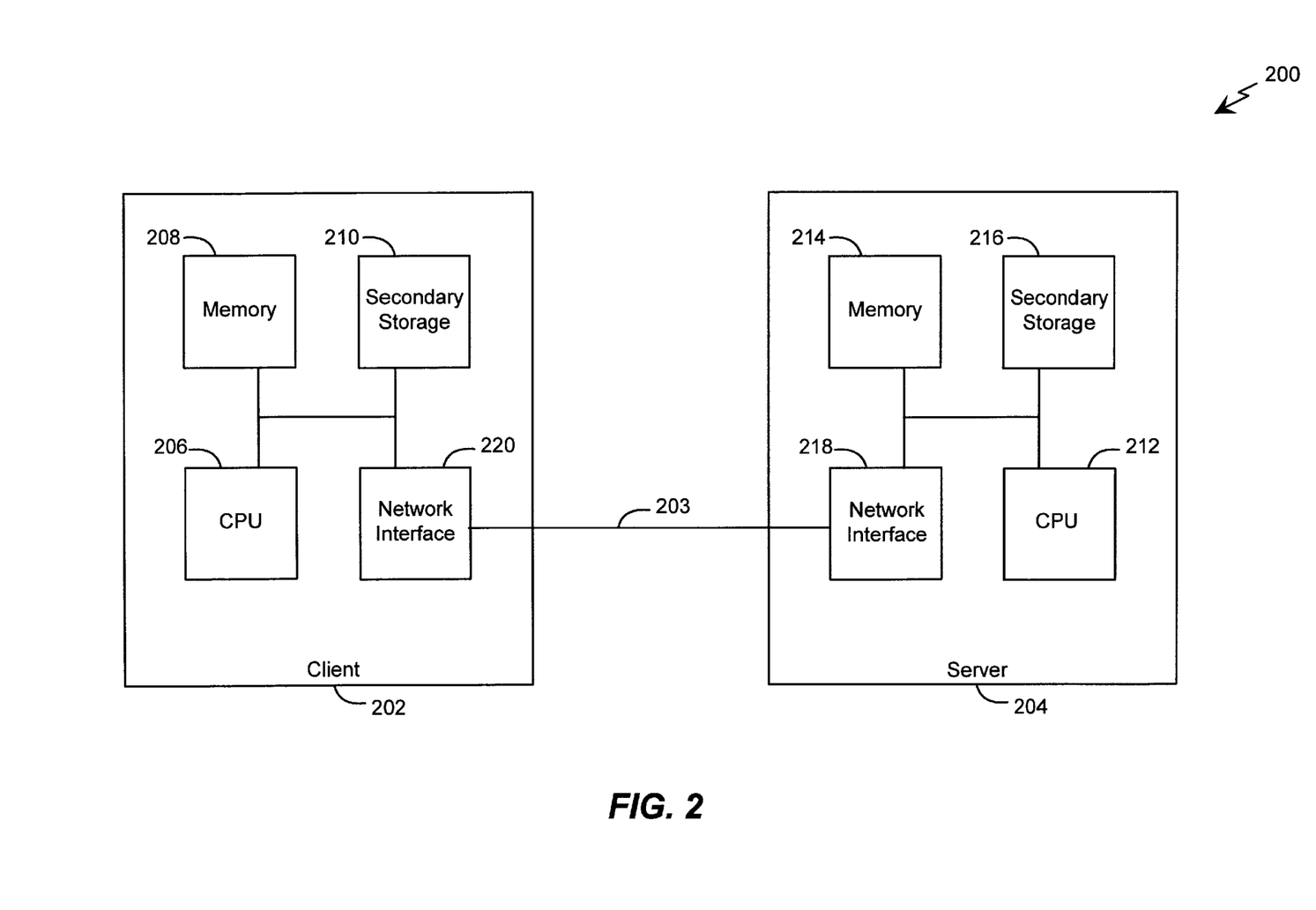
FIG. 2 depicts a block diagram of a data processing system suitable for practicing embodiments of the present invention.

FIG. 2 depicts a data processing system 200 that is suitable for practicing embodiments of the present invention. The data processing system 200 contains a client 202 and a server 204 that are interconnected via a network 203. The network 203 can be any of a number of different networks, including, but not limited to, a local area network or a wide area network. The client 202 and the server 204 each contain memory 208, 214, a secondary storage device 210, 216, a central processing unit (CPU) 206, 212, and a network interface 220, 218. The network interfaces 220, 218 interact with the network 203 to transfer data between the client 202 and the server 204. Although the client and server are depicted with a specific configuration of components, one skilled in the art will appreciate that additional or different components may be used. In addition, although the preferred embodiment is described as being utilized on two interconnected computer systems, one skilled in the art will appreciate that the present invention can be utilized on a single computer system.

Since no stubs are utilized on the sever side of the preferred embodiment of the present invention, the off-line building of the preferred RPC system is somewhat different from the building of a conventional RPC system. Before utilizing the preferred embodiment of the present invention, a user utilizes the Microsoft Interface Definition Language Compiler ("MIDL") which is available from Microsoft Corporation of Redmond, Washington. MIDL can be utilized in conventional mode and interpreted mode. When utilizing MIDL in conventional mode, MDL creates conventional client and server stubs. When utilizing MDL in interpreted mode, MIDL builds the client side stubs with reduce code that invokes the interpreter and returns arguments to the caller. On the server side, MIDL does not create server stubs, but instead creates a function table and a descriptor table that contain sufficient information for the server side interpreter to create an argument stack at runtime and to invoke a remote function. This concept is best described with reference to FIG. 3, which depicts a diagram illustrating the utilization of MDL in interpreted mode. MIDL 304 receives as input user generated function definitions 302 for the functions that are to be accessed remotely. An example of a function definition is depicted below in Code Table Number One.

Figure 3:
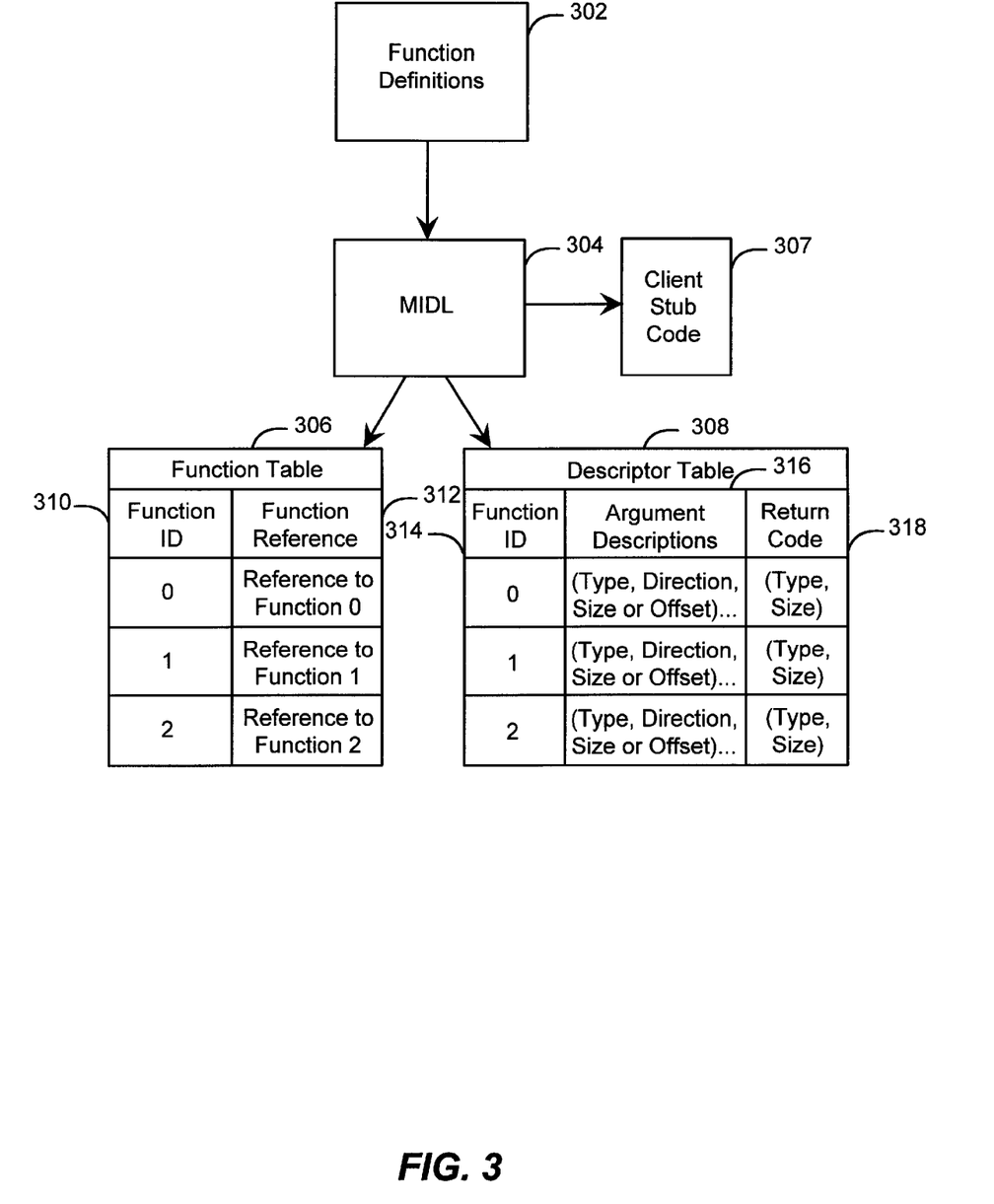
FIG. 3 depicts the creation of a function table and a descriptor table utilized by embodiments of the present invention.

---
Code Table Number One interface test
{
    short GenericProc(  [in] ushort A,
                                 [in] uchar *B,
                                 [out] uchar *C);
}

---

As can be seen from the above definition, one function "GenericProc" is defined with three arguments: "a," which is a short and an input parameter; "b," which is a pointer to a character with an "in" direction; and "c," which is a pointer to a character with an "out" direction. In addition, the GenericProc function returns a short as a return value. After receiving the function definitions 302, MIDL 304 generates client stub code 307, a function table 306, and a descriptor table 308. The client stub code 307 can be input to a C compiler to produce client stubs that can then be linked into an application program. The function table 306 contains function IDs 310 and references to functions 312. Thus, by indexing into the function table 306 with a particular function ID, the address of a function can be obtained. The descriptor table 308 contains function IDs 314, argument descriptions 316 and return code descriptions 318. The function IDs 314 are similar to those as described relative to the function table 306. The argument descriptions are a number of three tuples with each tuple having a type, a direction, and a size or offset for an argument. There is one tuple for each argument of a function. The "type" refers to the data type of the argument. The "direction" refers to the direction of the argument when the argument is a pointer such as in, in/out, or out. The "size or offset" refers to the size of the argument, or when the argument is a conformant object or a varying object, it refers to the offset within the argument stack of the specifier argument that contains the size of the object. The return code description 318 comprises a two tuple containing the type of the argument being returned as well as the size of the argument.

Figure 4:
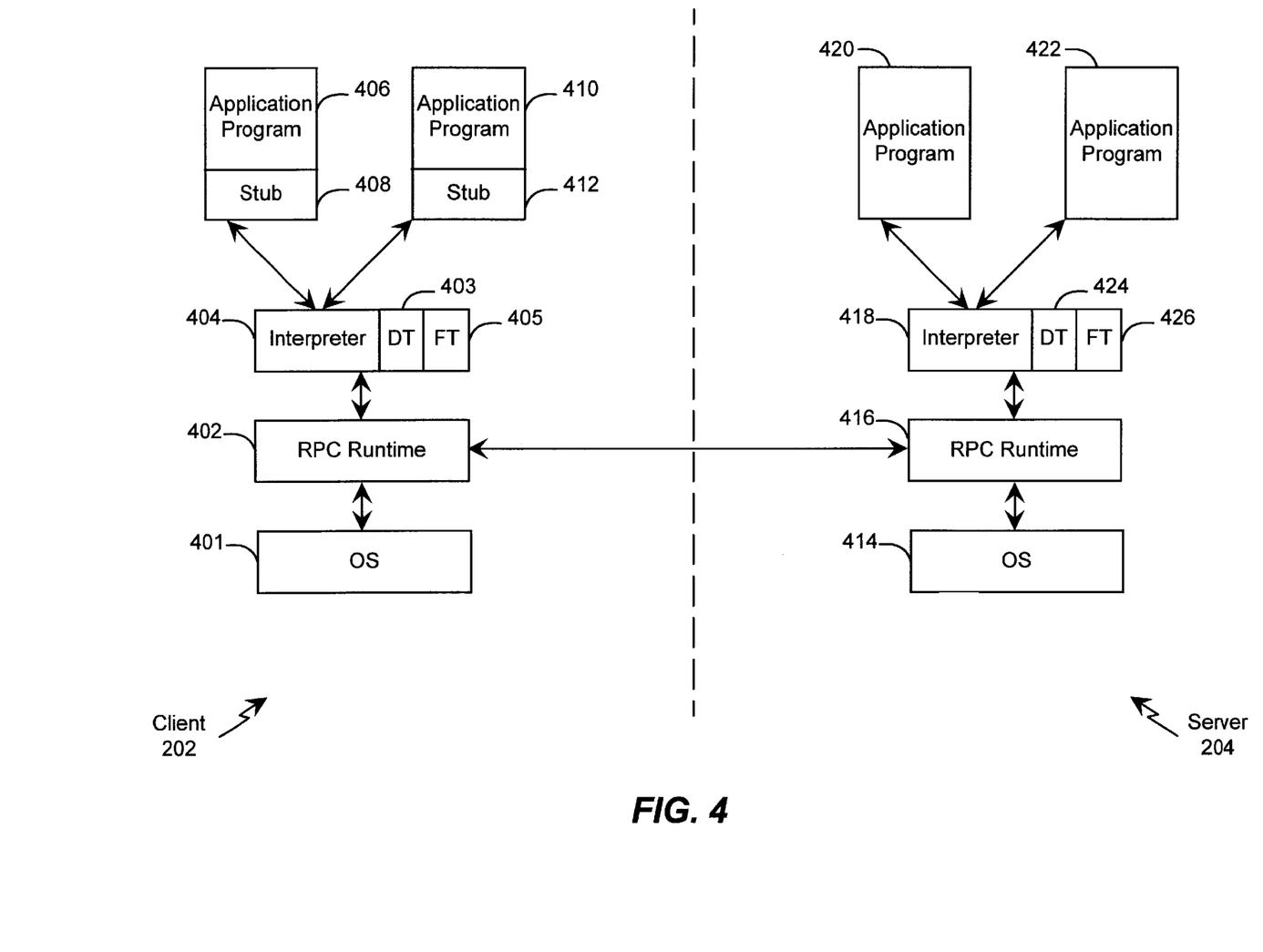
FIG. 4 depicts a block diagram of a preferred embodiment of the present invention.

FIG. 4 depicts a block diagram of the preferred embodiment of the present invention. The client 202 contains an operating system 401, an RPC runtime facility 402, an interpreter 404 and two application programs 406, 410. The interpreter 404 has a descriptor table ("DT") 403 and a function table ("FT") 405. Each application program 406, 410 has a client stub 408, 412 for interfacing with the interpreter 404. The interpreter 404 marshals arguments into a runtime buffer maintained by the RPC runtime 402 as well as unmarshals arguments out of the runtime buffer and passes the arguments to the client stubs 408, 412. The interpreter 404, thus, consolidates the code for marshaling and unmarshalihg, thereby reducing the size of the client stubs 408, 412 over conventional systems. Since the interpreter 404 performs the marshaling and the unmarshaling, the client stubs 408, 412 have code that invokes the interpreter when initially performing the remote procedure call and that passes the results of the RPC to the application programs 406, 410 when the invoked function completes. The descriptor table 403 and the function table 405, as previously described, contain information for creating an argument stack and for invoking a remote function, although the argument stack for functions interfacing with the client stubs is created at compile time.

The sever 204 contains an operating system 414, an RPC runtime facility 416, an interpreter 418, and two application programs 420, 422 which contain functions for remote invocation. The interpreter contains a descriptor table 424 and a function table 426. The application programs 420 and 422 are stubless (i.e., no stub is utilized). The interpreter 418 receives data from the RPC runtime facility 416 that reflects a remote procedure call. Upon receiving the data from the RPC runtime facility 416, the interpreter utilizes the descriptor table 424 and the function table 426 to construct an argument stack completely at runtime, which includes determining the format information, and invokes the appropriate function of either application program 420 or application program 422. In addition, when the invoked function completes, the interpreter 418 copies the returned results into an RPC runtime buffer and sends the results back to the caller. Thus, the interpreter of the present invention creates an argument stack for a function completely at runtime, relieves the necessity of having a stub on the server side and therefore reduces storage requirements for performing RPCs. Both the client side interpreter 404 and the server side interpreter 418 are stored in a dynamically linked library and are linked into the address space of the caller or callee at runtime.

During the processing of a remote procedure call, it is not uncommon for an exception to be generated by either the operating system or the network, or by some other hardware or software entity. Exceptions are typically generated when an error has occurred for such things as an invalid memory address being referenced. As part of any remote procedure call mechanism, it is important to send exceptions to the client so that they may be handled in an efficient manner. Therefore, the preferred embodiment of the present invention, upon receiving an exception, sends the exception to either the caller or the operating system of the client for handling. The preferred embodiment of the present invention is intelligent enough to know where to send the exceptions, depending on the type of exception generated.

Figure 5:
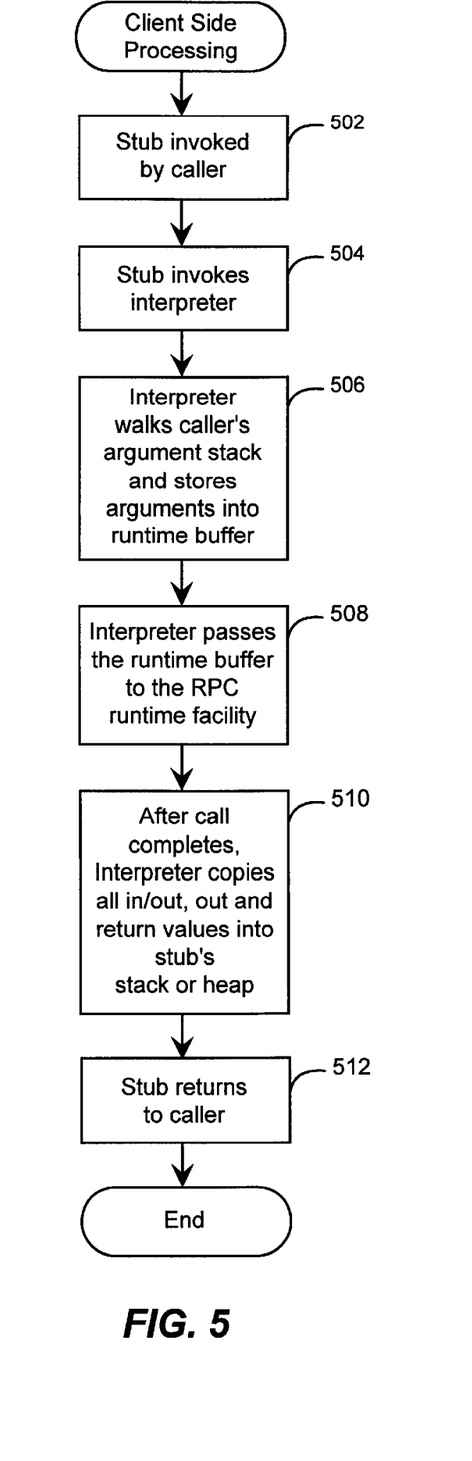
FIG. 5 depicts a flowchart of the steps performed by the preferred embodiment of the present invention for client side processing of a remote procedure call.

FIG. 5 depicts a flowchart of the steps performed by the preferred embodiment of the present invention for client side processing. The first step performed on the client side is that the caller invokes the client stub by calling the client stub (step 502). The client stub then invokes the interpreter (step 504). The client stub invokes the interpreter as a varargs function ("NDRClientCall" ). Invoking a function as a "varargs" function forces all arguments, some of which may be stored in registers, onto an argument stack for the function. Since different processors typically use different conventions for passing arguments, invoking a function as a varargs function allows the arguments to be passed between the client and the server in a processor-independent way. The client stub invokes the interpreter passing various information. The client stub passes a pointer to a "stub message," which refers to a description of the data in the argument stack of the caller. That is, for each argument, the stub message indicates the data type. The stub message is an array of characters with each data type being assigned a character value (e.g., 1 for longs) and each position of the array corresponding to the position of the argument within the argument stack. In addition, the stub message contains the function ID for the requested remote function. The client stub also passes a reference to the start of the argument stack of the caller to the interpreter.

After receiving this information, the interpreter walks the argument stack of the caller and stores the arguments into a runtime buffer that is allocated from the RPC runtime facility (step 506). The phrase "walk the argument stack" refers to accessing each argument within the argument stack to determine its size and copying the argument to a runtime buffer. The interpreter walks the argument stack of the caller by using the standard C macros va_start and va_arg and by using the argument descriptions in the stub message as a guide. After determining the size of each argument, the interpreter allocates a runtime buffer of a sufficient size from the RPC runtime facility. The interpreter then copies each argument into the runtime buffer utilizing the network data representation ("NDR") standard as described in Open Software Foundation, *Application Environment Specification, Distributed Computing RPC Volume*, at 14-1–14-37 (1994) Although the preferred embodiment is described as using the NDR standard, one skilled in the art will appreciate that the present invention can be used with other data formats. While copying the arguments into the runtime buffer, if a pointer is encountered, the pointer is dereferenced and the data referred to is copied into the buffer. The argument stack stores all arguments as being aligned to the size of an integer (typically four bytes, depending on the processor and the operating system). Thus, when an argument is encountered in the argument stack that is less than the size of an integer, the value is copied into the runtime buffer and the size of an integer is skipped over in the argument stack. When a data type is encountered that is larger than an integer, the data is copied and an even multiple of integers is skipped over. When encountering a heterogeneous type, again, the data is copied and an even multiple of integers is skipped over according to the size of the data as passed in the stub message. In summary, this step sizes all of the data from the argument stack of the caller, allocates a correctly sized runtime buffer, and marshals the arguments into the runtime buffer utilizing NDR format.

After creating the runtime buffer, the interpreter passes the runtime buffer to the RPC runtime facility (step 508). Sometime later, the RPC completes and the interpreter is invoked with a runtime buffer that will contain the results of the RPC. The interpreter then copies all in/out arguments, out arguments and the return value from the runtime buffer into the argument stack of the caller (step 510). When copying the results, if an out pointer is encountered, since no storage has been allocated for it, the interpreter allocates sufficient storage on the heap of the caller and inserts a pointer into the argument stack. After copying all in/out arguments, out arguments and the return value into the stub argument stack or heap, the client stub returns to the caller (step 512). The caller can then utilize the results for its normal processing.

During the client side processing, the interpreter handles a couple of special case situations. When the interpreter is either marshaling arguments into the runtime buffer or unmarshaling arguments out of the runtime buffer, if the interpreter encounters a primitive handle, the interpreter skips over it. A "primitive handle" is an identifier of a resource, such as a file. Another special case occurs when dealing with alignments. The alignment of an argument stack is usually performed by the hardware and the arguments are typically 4-byte aligned. However, certain processors (such as the MIPS R4000 family of processors available from MIPS Technologies of Mountain View, Calif.) do not perform stack alignments at the hardware level. These processors usually require an 8-byte stack alignment for doubles, 8-byte integers and heterogeneous types that contain either a double or an 8-byte integer. Therefore, the interpreter of the preferred embodiment of the present invention performs 8-byte alignment for doubles, 8-byte integers and heterogeneous types containing doubles or 8-byte integers on these processors.

Figure 6:
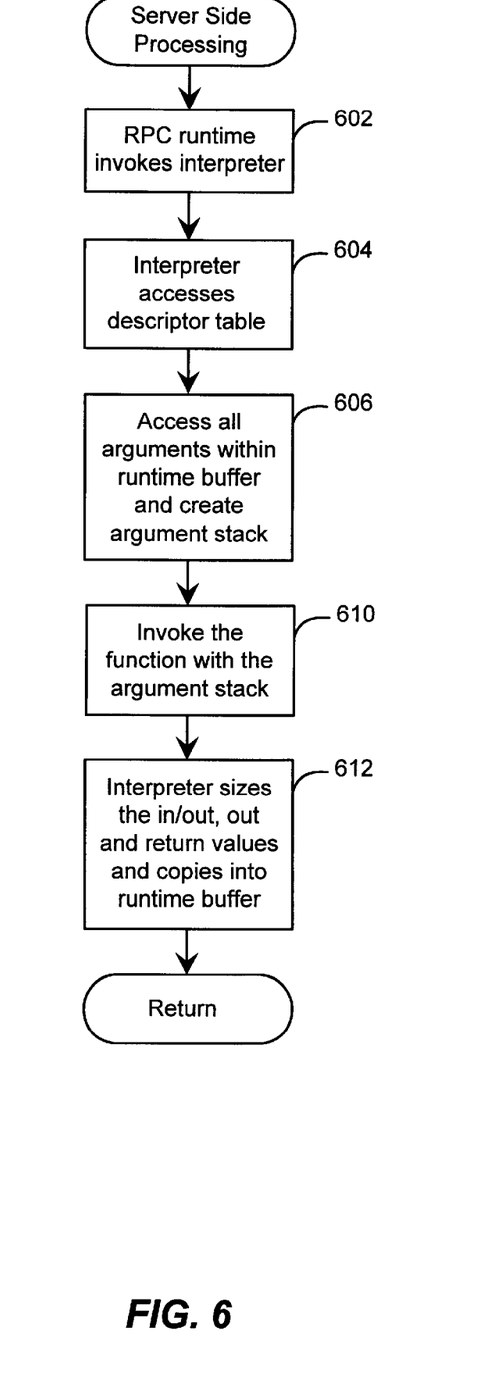
FIG. 6 depicts a flowchart of the steps performed by the preferred embodiment of the present invention for server side processing of a remote procedure call.

FIG. 6 depicts a flowchart of the steps performed by the preferred embodiment of the present invention for server side processing. The first step performed on the server side is that the RPC runtime facility invokes the interpreter with a runtime buffer and a function ID (step 602). The RPC runtime facility invokes the interpreter using a dispatch table. The dispatch table contains, at runtime, the entry point for the interpreter. The RPC runtime indexes into the dispatch table utilizing the function ID, which returns the appropriate address of the entry point of the interpreter as linked into the address space of the callee. After being invoked, the interpreter accesses the descriptor table (step 604). The interpreter utilizes the function ID that has been passed to the interpreter from the RPC runtime facility to retrieve an entry in the descriptor table having a description of the arguments. The interpreter then accesses all of the arguments within the runtime buffer and creates the argument stack (step 606). In this step, the interpreter either copies the value of each argument from the runtime buffer into a buffer that it has allocated to be used as the argument stack or, when a pointer is encountered, allocates another buffer on the heap of the callee to store the value and inserts a pointer to the buffer into the argument stack. The processing performed by the interpreter when creating the argument stack is further described below. After creating the argument stack, the interpreter invokes the desired function with the argument stack (step 610). In this step, the interpreter accesses the function table with the function ID to retrieve the address of the desired function. After retrieving the address of the desired function, the interpreter invokes the function with the argument stack, thereby executing the function. Sometime later, the function completes execution and the interpreter sizes the in/out arguments, out arguments and the return value and copies these values into a newly-allocated runtime buffer (step 612). In this step, the interpreter determines the size of the results, allocates an appropriately sized runtime buffer, copies the results into the buffer and returns the buffer to the RPC runtime facility where it is sent to the caller.

Figure 7:
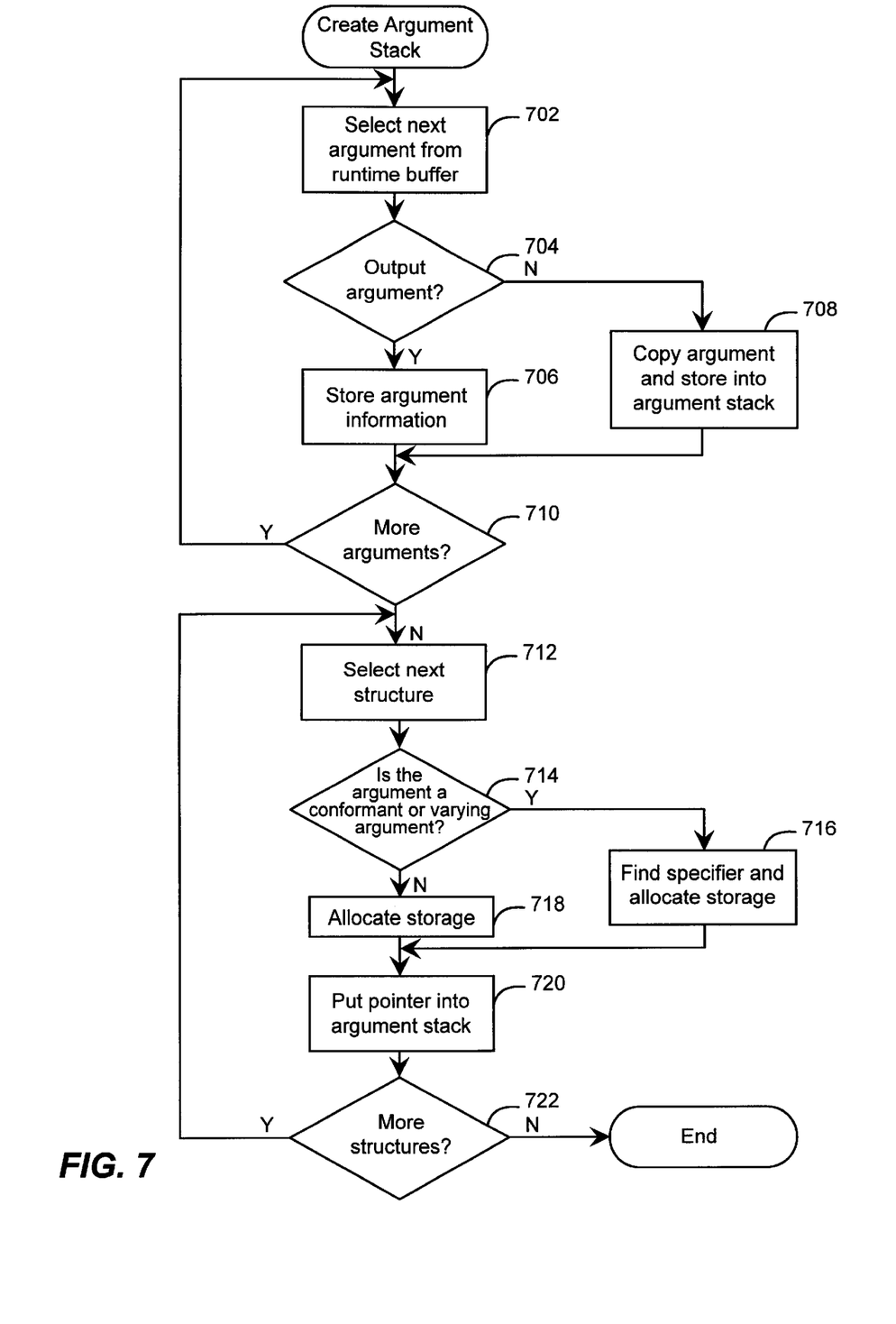
FIG. 7 depicts a flowchart of the steps performed by the preferred embodiment of the present invention for creating an argument stack.

FIG. 7 depicts a flowchart of the steps performed by the preferred embodiment of the present invention when creating an argument stack. The processing described is performed to unmarshal the parameters within the runtime buffer to a buffer that is utilized by tie interpreter as the argument stack. In creating the argument stack, the argument stack is constructed using the StdCall calling convention. The "StdCall" calling convention specifies that the arguments are passed in the order from right to left, the argument passing is done by value unless a pointer or a reference type is used, the callee is responsible for popping its arguments off of the stack, and the function name is passed with a preceding underscore (_) and a following at-sign (@). The at-sign is followed by the number of bytes contained in the argument list. In order for StdCall argument stacks to be effective, the functions of the server application programs that are remotely accessible are compiled so as to expect argument stacks in StdCall format. The first step performed in creating the argument stack is that the interpreter selects the next argument from the runtime buffer, starting with the first (step 702). The interpreter determines if the argument is an output argument by examining the entry retrieved from the descriptor table in step 604 of FIG. 6 (step 704). If the argument is an output argument, the interpreter stores sufficient information pertaining to the argument to process the argument at a later time (step 706). The information stored regarding this argument is stored into an array of structures that contain the argument description from the descriptor table entry, the location in the argument stack where the argument is to be inserted, and the parameter number (i.e., relative to the other arguments in the runtime buffer). This structure is defined below in code table number two.

Code Table Number Two

```
typedef struct DEFER_QUEUE_INFO {
    PFORMAT_STRING  pFormat;      //Argument description from descriptor table
    uchar *__RPC_FAR *  ppArg;    //Argument Location on stack
    long            ParamNumber;  //Position number of parameter
} DEFER_QUEUE_INFO,__RPC_FAR * PDEFER_QUEUE_INFO;
```

This information is stored so as to enable delaying the processing of all output arguments until after all other arguments in the runtime buffer have been processed. The delay of the processing of the output parameters is performed in case the output parameter is a conformant object or a varying object, where the proper size allocation cannot immediately be performed since, size information is not readily available. Thus, the output arguments are skipped until the size of the output argument is guaranteed to be known (i.e., after all other arguments are processed). If the argument is not an output argument, the interpreter copies the argument and stores the argument into the argument stack (step 708). The interpreter stores the argument into the argument stack at the proper location as specified by the entry in the descriptor table. The interpreter then determines whether there are more arguments within the runtime buffer (step 710). If there are more arguments within the runtime buffer, processing continues to step 702 where the interpreter selects the next argument from the runtime buffer. If, however, there are no more arguments within the runtime buffer, the interpreter selects the next DEFER_QUEUE_INFO structure, starting with the first (step 712). That is, the interpreter now processes each output argument that was saved in step 706. Next, the interpreter determines if the argument is a conformant or a varying argument (step 714). This determination is made by examining the argument description from the descriptor table as contained in the DEFER_QUEUE_INFO structure. If the argument is a conformant or varying argument, the interpreter locates the specifier argument and allocates sufficient storage on the heap of the callee to store the argument (step 716). If, however, the argument is not a conformant or varying argument, the interpreter allocates sufficient storage on the heap of the server application to store the argument by examining the argument description (step 718). After storing the argument into the heap of the server application, the interpreter places a pointer to the storage allocated on the heap into the argument stack at the location specified by the ppArg element of the DEFER_QUEUE_INFO structure (step 720). By handling arguments in this fashion, sufficient storage is allocated so that the function can store output arguments at the referenced location. After placing a pointer into the argument stack, the interpreter determines if there are more structures for processing (step 722). If there are more structures for processing, the interpreter continues to step 712 and processes another structure. After all structures have been processed, the argument stack is complete and processing ends.

Figure 8:
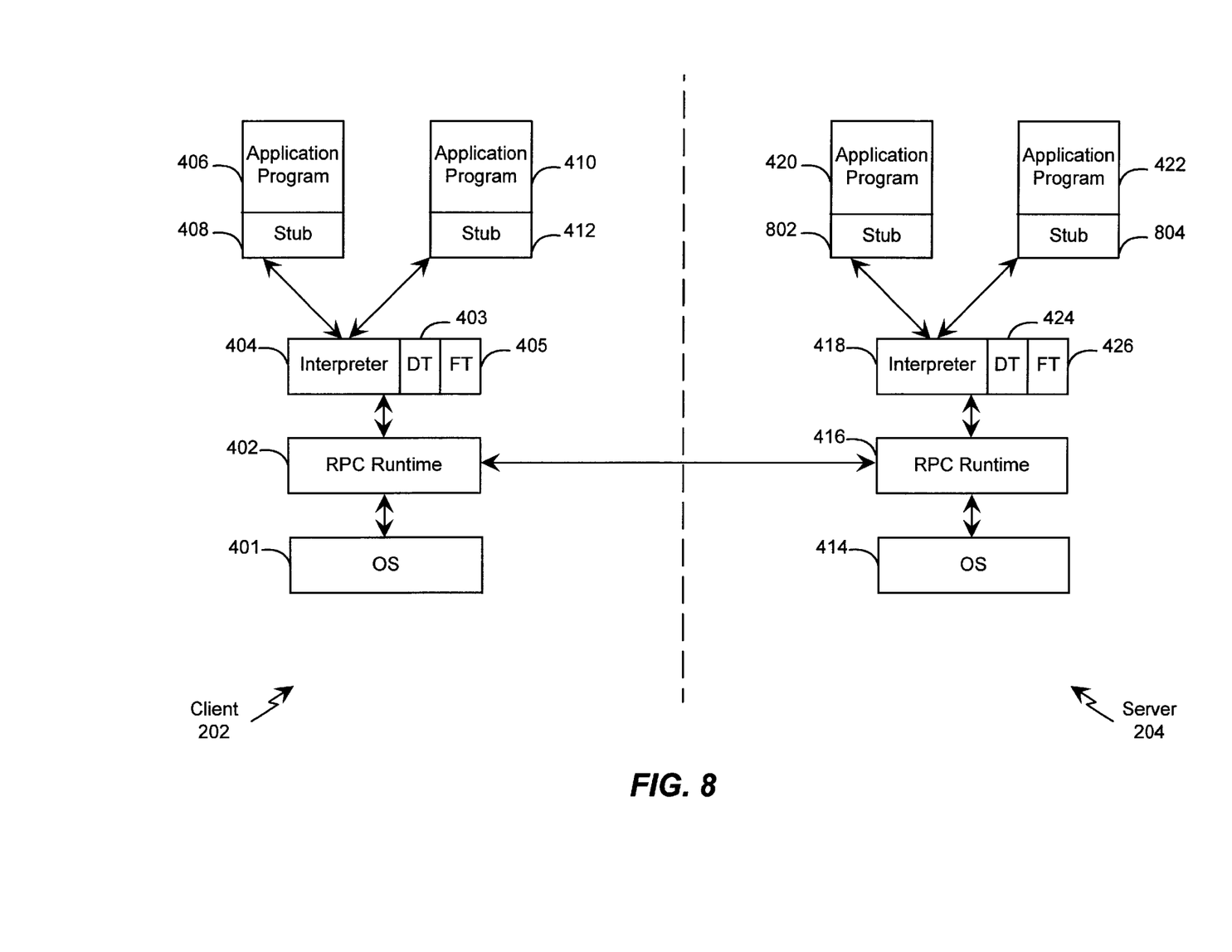
FIG. 8 depicts a block diagram of an alternative embodiment of the present invention.

FIG. 8 depicts an alternative embodiment of the present invention. In the alternative embodiment of the present invention, each server side application program 420, 422, has a stub 802, 804. The stubs 802, 804 of the alternative embodiment of the present invention contain local variables to store the arguments for invoking the remote function and code to invoke the interpreter 418. The interpreter 418 performs the marshaling and unmarshaling of the arguments. Thus, the stubs 802, 804 of the alternative embodiment contain just enough code to interact with the interpreter and do not perform any marshaling or unmarshaling, thereby significantly reducing the amount of code over conventional server stubs.

The processing performed by the alternative embodiment differs from the preferred embodiment on the server side. When receiving an RPC message by the alternative embodiment of the present invention, the RPC runtime facility invokes the stub of the server side application program. As previously described, the stub has one local variable for each argument for the function. The stub uses these local variables to invoke the local function call. In order to copy the arguments into the local variables, the stub invokes the interpreter for each local variable to copy the value of the argument from the RPC runtime buffer into the local variable. Therefore, the interpreter performs all marshaling. The stub then invokes the function with the local variables as arguments. After returning, the stub invokes the interpreter to unmarshal the in/out arguments, out arguments and the return value into an RPC runtime buffer. The stub then returns control to the RPC runtime facility that then sends the runtime buffer to the client. The stubs of the alternative embodiment of the present invention on the server side are generated by MIDL with sufficient code to invoke the interpreter to handle the marshaling and unmarshaling and with sufficient data to generate local variables for each argument of the functions that it supports.

The present invention performs interpreted remote procedure calls. The two embodiments described herein save significant storage within a data processing system that performs remote procedure calls. In the preferred embodiment, the interpreter performs all marshaling and unmarshaling and on the server side the preferred embodiment performs its processing without the need for stubs. Therefore, the preferred embodiment of the present invention significantly reduces storage requirements for code and data for performing remote procedure calls. The alternative embodiment of the present invention also performs all marshaling and unmarshaling by the interpreter, thereby consolidating the marshaling and unmarshaling code within the interpreter. By consolidating the marshaling and unmarshaling code, the alternative embodiment of the present invention minimizes the duplication of code and thus significantly reduces storage requirements.

While the present invention has been described with reference to a preferred embodiment thereof, those skilled in the art will know of various changes in form that may be made without departing from the spirit and scope of the claimed invention as defined in the appended claims.

What is claimed is:

1. A method for invoking a remote function called from a program executing within a first process running on a first computer, there being at least two programs executable on the computer within separate processes, each program including a call to a different remote function, the method comprising:

in response to the invocation of the remote function from the executing program, invoking a client-side interpreter shared by the two programs, the interpreter passing an indication of the remote function and an argument of user-defined type;

under control of the client-side interpreter, preparing a generic representation of the argument of the user-defied type, wherein the generic representation can be used to represent arguments of any user-defined type; and transmitting the prepared generic representation along with an indication of the remote function to a server-side interpreter shared by different remote function invocations; and under control of the server side interpreter, analyzing the contents of the transmitted generic representation to prepare the argument of the user-defined type for passing to a local function corresponding to the indicated remote function; and calling the local function and passing the prepared arguments.

2. The method of claim 1 wherein the invoked remote function executes within a second process running on the first computer.

3. The method of claim 1, further including:

under control of the server side interpreter, after the local function finishes execution, preparing a generic representation of a return value of a user-defined type; and transmitting the prepared generic representation of the return value to the client-side interpreter;

under control of the client-side interpreter, extracting the return value of the prepared generic representation rendering of the return value of the user-defined type and presenting the return value to the program.

4. The method of claim 1 wherein the generic representation is in accordance with the network data representation standard.

5. A computer-readable medium having computer-executable instructions for performing the method of claim 1.

6. A computer-readable medium containing computer instructions for invoking a remote C language function called from a C language program executing within a first process running on a first computer by:

in response to the invocation of the remote function from the executing program, invoking a client-side interpreter tat identifies the remote C language function that has been invoked and prepares a generic representation of any arguments passed to the remote C language function, including arguments of any user-defined type;

preparing a generic representation of the remote function invocation and of any arguments passed to the remote function by the client-side interpreter, wherein the client-side interpreter consolidates marshaling for at least two different functions;

transmitting the prepared generic representation by the client-side intepreter to a server-side interpreter;

analyzing the contents of the prepared generic representation by the server-side interpreter to determine a local function that corresponds to the remote function invoked from the executing program and to prepare arguments extracted by the intepreter from the prepared generic representation in a form that can be accessed by the local function; and calling the local function by the server-side interpreter and passing the prepared arguments to the local function.

7. A programming development environment for developing a program to execute within a first process running on a first computer, the program having the ability to invoke a remote function, the environment comprising:

a run-time interpreted mechanism providing an interpreter for receiving and responding to requests to invoke a plurality of functions, wherein the interpreter consolidates marshaling for at least two of the plurality of functions; and a compile-time, stub generation mechanism generating a stub for each of the plurality of functions, each stub handling remote procedure calls of the function, whereby a user can select the run-time interpreted mechanism to provide an interpreter and select the compile-time, stub generation mechanism to generate stubs.

8. A method for invoking a remote C language function called from a C language program executing within a process running on a first computer, there being at least two C language programs executable on the computer within separate processes, each program including a call to a different remote C language function, the method comprising:

in response to the invocation of a remote C language function within one of the C language programs, invoking a client-side interpreter shared by the two C language programs, the client-side interpreter including a function table and a descriptor table and consolidating marshaling for at least two of the different C language functions;

in the client-side interpreter:
from the function table, identifying the remote C language function that has been invoked;
from the descriptor table, determining arguments passed to the remote C language function; and
marshaling the determined arguments into a data rendering;

passing the data rendering from the client-side intepreter to a client-side remote procedure call runtime facility;

transmitting the data rendering from the client-side remote procedure call runtime facility to a server-side remote procedure call runtime facility;

passing the data rendering from the server-side remote procedure call runtime facility to a server-side interpreter shared by different remote C language function invocations, the server-side interpreter including a friction table and a descriptor table and consolidating unmarshaling for at least two of the different C language function invocations; and in the server-side interpreter:
from the C language function invocation and the function table, determining a function identifier corresponding to the remote C language function;
from the function identifier, finding an address of the remote C language function;

from the function identifier and the descriptor table, determining argument descriptions and a return value type for the remote C language function; and
from the argument descriptions, unmarshaling the arguments in the data rendering; and calling from the client-side interpreter to the remote C language function at the function's address and passing to it the unmarshaled arguments.

9. The method of claim 8 wherein the invoked remote C language function executes within a second process running on a second computer.

10. The method of claim 8 wherein the invoked remote C language function executes within a second process running on the first computer.

11. The method of claim 8 wherein argument values, as well as a return value, can be returned from the remote C language function to the calling C language program via transmission within a rendering of the argument values and return value.

12. The method of claim 11 wherein arguments passed by the C language program to the invoked remote C language function may include "in" arguments, "out" arguments, and "in/out" arguments, a value corresponding to an "in" argument passed to the remote C language function from the C language program, a value corresponding to an "out" argument passed from the remote C language function to the C language program, and a value corresponding to an "in/out" argument passed to the remote C language function from the C language program and a value corresponding to an "in/out" argument passed from the remote C language function to the C language program.

13. The method of claim 8 wherein marshaling the determined arguments into a data rendering comprises preparing a network data representation renderig.

14. The method of claim 8 including, after the local C language function executes:

presenting a return value from the local C language function to the server-side interpreter;

marshaling in the server-side interpreter the return value into a rendered value using the return value type;

passing the rendered return value from the server-side interpreter to the server-side remote procedure call runtime facility;

transmitting the rendered return value from the server-side procedure call runtime facility to the client-side remote procedure call runtime facility;

passing the rendered return value from the client-side remote procedure call runtime facility to the client-side interpreter;

extracting in the client-side interpreter the return value from the rendered return value; and presenting the extracted return value to the C language program.

15. A computer-readable medium having computer-executable instructions for performing the method of claim 8.

16. A method for invoking a remote function from a program executing within a first process running on a first computer, there being at least two programs executable on the computer within separate processes, each program including a call to a different remote function, the method comprising:

in response to the invocation of a remote function within one of the programs, invoking a client-side interpreter shared by the two programs;

in the client-side interpreter, determining arguments passed to the remote function and marshaling the determined arguments into a data rendering;

transmitting the data rendering from the client-side interpreter to a server-side interpreter shared by the different remote function invocations;

in the server-side interpreter, determining from the data rendering an address and arguments of a local function corresponding to the remote function and extracting the arguments in the data rendering; and calling from the client-side interpreter to the local function at the function's address and passing to it the extracted arguments.

17. A computer-readable medium having computer-executable instructions for performing the method of claim 16.

18. A remote procedure call system for invoking a remote C language function called from a C language program executing within a process running on a first computer, there being at least two C language programs executable on the computer within separate processes, each program including a call to a different remote C language function, the system comprising:

a client-side interpreter invoked in response to the invocation of a remote C language function within one of the C language programs shared by the two C language programs, the client-side interpreter including a function table and a descriptor table, the client-side interpreter identifying from the function table the remote C language function that has been invoked, determining from the descriptor table arguments passed to the remote C language function, and marshaling the determined arguments into a data rendering, wherein the client-side interpreter consolidates marshaling for at least two of the different C language functions;

a client-side remote procedure call runtime facility to which the client-side interpreter passes the data rendering;

a server-side remote procedure call runtime facility to which the client-side remote procedure call runtime facility transmits the data rendering; and a server-side interpreter shared by the different remote C language friction invocations to which the server-side remote procedure call runtime facility passes the data rendering, the server-side interpreter including a function table and a descriptor table, the server-side interpreter determining a function identifier corresponding to the remote C language function from the C language function invocation and the function table, finding an address of the remote C language function from the function identifier, determining argument descriptions and a return value type for the remote C language fiction from the function identifier and the descriptor table, unmarshaling the arguments in the data rendering from the argument descriptions, and calling to the remote C language function at the function's address and passing to it the unmarshaled arguments, wherein the server-side interpreter consolidates unmashaling for at least two of the different C language functions.

19. The system of claim 18 wherein the invoked remote C language function executes within a second process running on a second computer.

20. The system of claim 18 wherein the invoked remote C language function executes within a second process running of the first computer.

21. The system of claim 18 including an interface definition language compiler that generates an executable proven from a C language program that includes a call to a remote C language function, wherein the interface definition language compiler compiles all calls to remote C language functions to invoke the remote C language functions using standard C language varargs argument passing, so that arguments are forced onto the argument stack rather than being passed in registers.

22. The system of claim 18 wherein the data rendering comprises a network data representation rendering.

* * * * *

UNITED STATES PATENT AND TRADEMARK OFFICE
CERTIFICATE OF CORRECTION

PATENT NO. : 6,321,275 B1
DATED : November 20, 2001
INVENTOR(S) : McQuistan et al.

It is certified that error appears in the above-identified patent and that said Letters Patent is hereby corrected as shown below:

Title page,
Item [56], References Cited, OTHER PUBLICATIONS, "Dineen et al; The Networking Computing Architecturg" should read -- Dineen et al; The Network Computing Architecture --.
"DCE Lightens Its Load" by David S. Limthicum, DBMS, V9, n7 p24(3) Jun, 1996.*" should read -- DCE Lightens Its Load" by David S. Linthicum, DBMS, V9, n7 P24(3) Jun, 1996.* --.

Column 1,
Line 52, "of-the" should read -- of the --.

Column 3,
Line 20, "o" should read -- invokes --.
Line 65, "entity the" should read -- entity, the --.

Column 4,
Line 3, "widths" should read -- with --.

Column 5,
Line 27, "sere" should read -- server --.
Line 49, "sever" should read -- server --.
Lines 58 and 59, "MDL" should read -- MIDL --.

Column 6,
Line 1, "MDL" should read -- MIDL --.

Column 8,
Line 14, "(1994)" should read -- (1994). --.

Column 10,
Line 37, "since," should read -- since --.

Column 12,
Line 15, "user-defied" should read -- user-defined --.
Line 57, "tat" should read -- that --.

UNITED STATES PATENT AND TRADEMARK OFFICE
CERTIFICATE OF CORRECTION

PATENT NO. : 6,321,275 B1
DATED : November 20, 2001
INVENTOR(S) : McQuistan et al.

It is certified that error appears in the above-identified patent and that said Letters Patent is hereby corrected as shown below:

Column 14,
Line 33, "renderig" should read -- rendering --.

Column 16,
Lines 2, "friction" should read -- function --.
Line 13, "fiction" should read -- function --.
Line 26, "of" should read -- on --.
Line 29, "proven" should read -- program --.

Signed and Sealed this

Twelfth Day of October, 2004

JON W. DUDAS
*Director of the United States Patent and Trademark Office*